United States Patent
Somasundaram et al.

(10) Patent No.: US 11,113,694 B1
(45) Date of Patent: Sep. 7, 2021

(54) AUTOMATED ANTI-MONEY LAUNDERING (AML) ALERTS INVESTIGATION AND DISPOSITION SYSTEM AND ASSOCIATED METHOD THEREOF

(71) Applicant: ENERGICA ADVISORY SERVICES PVT LTD., Tamil Nadu (IN)

(72) Inventors: Ramesh Babu Somasundaram, Chennai (IN); Umakanthan Velayutham, Chennai (IN)

(73) Assignee: ENERGICA ADVISORY SERVICES PVT LTD., Chennai (IN)

( * ) Notice: Subject to any disclaimer, the term of this patent is extended or adjusted under 35 U.S.C. 154(b) by 0 days.

(21) Appl. No.: 16/897,689

(22) Filed: Jun. 10, 2020

(30) Foreign Application Priority Data

Apr. 17, 2020 (IN) .............................. 202041016655

(51) Int. Cl.
*G06Q 20/40* (2012.01)
*G06Q 30/00* (2012.01)
(Continued)

(52) U.S. Cl.
CPC ....... *G06Q 20/4016* (2013.01); *G06F 16/164* (2019.01); *G06N 5/025* (2013.01);
(Continued)

(58) Field of Classification Search
CPC .. G06Q 30/0185; G06Q 10/10; G06Q 50/265; G06Q 20/4016; G06Q 40/02; G06N 5/025; G06F 16/164
See application file for complete search history.

(56) References Cited

U.S. PATENT DOCUMENTS

| 8,760,281 B1 * | 6/2014 | Rana | G06Q 10/10 340/521 |
| 10,163,158 B2 * | 12/2018 | Song | G06Q 40/06 |

(Continued)

FOREIGN PATENT DOCUMENTS

| CA | 3036725 A1 * | 3/2018 | ........... G06Q 40/025 |
| WO | WO-2020102395 A1 * | 5/2020 | ............. G06Q 20/40 |

OTHER PUBLICATIONS

ObserveIT: Alert Implementation Guide, 2018, pp. 1-61 (Year: 2018).*

(Continued)

*Primary Examiner* — Bijendra K Shrestha
(74) *Attorney, Agent, or Firm* — Maschoff Brennan

(57) ABSTRACT

An automated AML alerts investigation and disposition system includes an alert generation unit configured to generate alert data representative of AML alert transactions of one or more entities through a financial institution. The system further includes an alert investigation system communicatively coupled to the alert generation unit. The alert investigation system includes a storage server communicatively configured to receive the alert data from the alert generation unit. The alert investigation system further includes a trigger schedule module communicatively coupled to the storage server and configured to trigger a plurality of alerts of the alert data based on at least one of time instances and transaction events. The alert investigation system also includes an investigation module communicatively coupled to the trigger schedule module and configured to receive alerts of the alert data and categorize the plurality of alerts into one or more disposition categories based on predefined customizable rules.

9 Claims, 13 Drawing Sheets

(51) Int. Cl.
  *G06Q 40/02* (2012.01)
  *G06Q 10/10* (2012.01)
  *G06N 5/02* (2006.01)
  *G06Q 50/26* (2012.01)
  *G06F 16/16* (2019.01)

(52) U.S. Cl.
  CPC ......... *G06Q 10/10* (2013.01); *G06Q 30/0185* (2013.01); *G06Q 40/02* (2013.01); *G06Q 50/265* (2013.01)

(56) References Cited

U.S. PATENT DOCUMENTS

| | | | | |
|---|---|---|---|---|
| 2007/0174214 | A1* | 7/2007 | Welsh | G06Q 20/4016 705/405 |
| 2009/0125369 | A1* | 5/2009 | Kloostra | G06Q 10/00 705/35 |
| 2009/0132330 | A1* | 5/2009 | Shaw | G06Q 30/0201 705/7.29 |
| 2009/0327429 | A1* | 12/2009 | Hughes | G06Q 10/107 709/206 |
| 2010/0277307 | A1* | 11/2010 | Horton | G08B 25/006 340/539.11 |
| 2013/0061179 | A1* | 3/2013 | Alletto | G06Q 40/00 715/843 |
| 2014/0095144 | A1* | 4/2014 | Singh | H04L 12/1895 704/2 |
| 2014/0122315 | A1* | 5/2014 | Fuard | G06Q 40/04 705/37 |
| 2015/0199688 | A1* | 7/2015 | Sulur | G06Q 20/4016 705/39 |
| 2016/0034571 | A1* | 2/2016 | Setayesh | G06F 16/353 707/738 |
| 2016/0066124 | A1* | 3/2016 | Chang | G06Q 30/0269 455/41.2 |
| 2017/0116643 | A1* | 4/2017 | Berg | G06Q 30/0257 |
| 2017/0235960 | A1* | 8/2017 | Austin | G06N 20/00 726/25 |

OTHER PUBLICATIONS

Katkov, Neil: Automating AML is Not a Pipe Dream: We're Already Halfway There, Insight Article, Feb. 15, 2019, Nice Actimize, pp. 1-4. (Year: 2019).*

ObserveIT: Alert Implementation Guide, 2018, pp. 1-61 (Year: 2018) (Year: 2018).*

* cited by examiner

| | INVESTIGATION RESULTS | | | | | | | 128 | | | | |
|---|---|---|---|---|---|---|---|---|---|---|---|---|
| | | | | | | | | ALERT DETAILS | TRANSACTION DETAILS | | | |
| | ALERT ID | TRANSACTION DATE | CURRENCY | TRANSACTION AMOUNT | TRANSACTION CODE | TRANSACTION TYPE | ORIGINATOR NAME | BENEFICIARY NAME | SECONDARY ORIGINATOR NAME | SECONDARY BENEFICIARY NAME | ORIGIN COUNTRY | BENEFICIARY COU |
| ◉ | ALERT-26DEC2019-133 | 12/26/2019 | | 323185 | PMNTMD OPIADD | DEBIT | HILLIARY MCLLHERAN | CONWAY CONCANNON | — | — | USA | IND | CHE |
| ◉ | ALERT-26DEC 2019-133 | 12/26/2019 | | 148126 | PMNTMD OPIADD | DEBIT | HILLIARY MCLLHERAN | JAVIER STEINER | — | — | USA | IND | CHE |
| ◉ | ALERT-26DEC 2019-133 | 12/26/2019 | | 451111 | | DEBIT | HILLIARY MCLLHERAN | RUDOLFO THORWARTH | — | — | USA | AUS | CHE |
| ◉ | ALERT-26DEC 2019-133 | 12/26/2019 | | 282786 | PMNTMD OPIADD | DEBIT | HILLIARY MCLLHERAN | BERENICE GLANERT | — | — | USA | USA | CHE |
| ◉ | ALERT-26DEC 2019-133 | 12/26/2019 | | 127927 | PMNTMD OPIADD | DEBIT | HILLIARY MCLLHERAN | LACEY WORHAM | — | — | USA | IND | CHE |
| ◉ | ALERT-26DEC 2019-133 | 12/26/2019 | | 269320 | PMNTMD OPIADD | DEBIT | HILLIARY MCLLHERAN | SELIE GIARDOT | — | — | USA | AUS | CHE |
| ◉ | ALERT-26DEC 2019-133 | 12/26/2019 | | 33665 | PMNTMD OPIADD | DEBIT | HILLIARY MCLLHERAN | NOE LAPSLIE | — | — | USA | EUR | CHE |

FIGURE 9

INVESTIGATION RESULTS

→ 130

ALERT DETAILS, TRANSACTION DETAILS, PARTY RELATIONSHIP

| ALERT ID | TRANSACTION DATE | CURRENCY | TRANSACTION AMOUNT | TRANSACTION CODE | TRANSACTION TYPE | ORIGINATOR NAME | BENEFICIARY NAME | SECONDARY ORIGINATOR NAME | SECONDARY BENEFICIARY NAME | ORIGIN COUNTRY | BENEFICIARY COU |
|---|---|---|---|---|---|---|---|---|---|---|---|
| ALERT-26DEC2019-15 | 12/26/2019 | | 71714 | DERVOIRTCOMM | DEBIT | JAKE BIRD | HARY T. HAYWARD | — | — | AUS | AUS |
| ALERT-26DEC2019-15 | 12/26/2019 | | 49834 | | DEBIT | JAKE BIRD | MAHESH SOMABHAI DESAI | — | — | AUS | EUR |
| ALERT-26DEC2019-15 | 12/26/2019 | | 75359 | DERVOIRTCOMM | DEBIT | JAKE BIRD | NATURAL HOUSING PRIVATE LTD | — | — | AUS | EUR |

ALERT INVESTIGATION RESULTS

THE ALERT IS ESCALATED, BECAUSE OF THE FOLLOWING REASON (S)

RULE "L01-RISK MANAGEMENT" HAS BEEN ESCALATED BECAUSE OF NEGATIVE NEWS FOUND SEE RESULTS

FIGURE 10

AUTOMATED ANTI-MONEY LAUNDERING (AML) ALERTS INVESTIGATION AND DISPOSITION SYSTEM AND ASSOCIATED METHOD THEREOF

TECHNICAL FIELD

The present disclosure relates to field of Anti-Money Laundering (AML), and more specifically to automated AML transaction monitoring system and method for optimizing AML alert investigation process for a financial institution.

BACKGROUND

It is well known that money laundering techniques have become more sophisticated Financial institutions face fundamental strategic, methodological, and operational challenges with regard to monitoring anti-money laundering (AML) transactions. Financial institutions are spending huge effort, cost, and resources into monitoring such transactions due to associated regulatory pressure and non-compliance. The number of such transactions keeps increasing due to the sophisticated laundering techniques and other challenges faced by financial institutions.

Technology enablement in AML transaction monitoring alert investigation is inevitable in today's digital landscape considering the complex nature of transactions, channels, geography, financial risk, crime, compliance issues. The AML transaction monitoring of alerts continues to grow, with the addition of new technologies, services, geographies, new delivery models as well as an increasing focus from regulators. Large numbers of customer organizations are increasingly aware of and understand the importance of optimizing the alert investigation management, processes, and governance to realize cost savings from AML alert investigation processes, mitigate the applicable risks, minimize value leakages, and to fulfil regulatory compliance.

Conventional AML alert investigation process deployed and followed by financial institutions is completely manual. Alert Disposition process has proved to be challenging because of several challenges faced during the course of AML alert Investigation process. Some of the drawbacks associated with the conventional process include lack of a proper monitoring of critical data elements for data quality and completeness, data gaps in transaction monitoring alerts such as duplicate alerts due to look back period, missing transactions, data quality issues, invalid mappings, and gaps in scenario coverage, lack of documentary evidence to rationalize scenarios and thresholds chosen, scenario coverage and thresholds not being optimized since initial implementation. Further drawbacks include inadequate transaction investigation practices, decision errors, insufficient and inconsistent investigation documentation, insufficiently trained investigation staff, lack of regular testing and continual improvements, and lack of statistical analysis to justify thresholds settings.

There are inappropriate alignment issues emerging between demand and compliance organizations (Bank, FIs and Regulators) in today's AML transaction financial Crimes, Risk and Compliance landscape. No single solution accelerator or tool or platform comprehensively covers either the core functionalities or the entire bandwidth of functions within AML Alert Investigative management and governance value chain or cut across different aspects of AML Investigation management.

There is a need for an enhanced system which overcomes above-mentioned drawbacks associated with the conventional AML transaction monitoring technique.

SUMMARY OF THE INVENTION

In accordance with one embodiment of the present disclosure, an automated AML alerts investigation and disposition system is disclosed. The automated AML alerts investigation and disposition system includes an alert generation unit configured to generate alert data representative of AML alert transactions of one or more entities through a financial institution. The automated AML alerts investigation and disposition system further includes an alert investigation system communicatively coupled to the alert generation unit. The alert investigation system includes a storage server communicatively configured to receive the alert data from the alert generation unit. The alert investigation system further includes a trigger schedule module communicatively coupled to the storage server and configured to trigger a plurality of alerts of the alert data based on at least one of time instances and transaction events. The alert investigation system also includes an investigation module communicatively coupled to the trigger schedule module and configured to receive the plurality of alerts of the alert data and categorize the plurality of alerts into one or more disposition categories based on a plurality of predefined customizable rules.

In accordance with another embodiment, a method for operating an automated Anti-Money Laundering (AML) alerts investigation and disposition system is disclosed. The method includes generating, by an alert generation unit, alert data representative of AML alert transactions of one or more entities through a financial institution. The method further includes receiving, by a storage server, the alert data from the alert generation unit. The method also includes triggering, by a trigger schedule module, a plurality of alerts of the alert data based on at least one of time instances and transaction events. Further, the method includes categorizing, by the investigation module, the plurality of alerts into one or more disposition categories based on a plurality of predefined customizable rules.

BRIEF DESCRIPTION OF THE FIGURES

The disclosed system and method will be described and explained with additional specificity and detail with the accompanying figures in which:

FIG. 9 is a schematic representation of an AML Alert investigation dashboard generated by the exemplary system depicting risk evidence and transactional relationships in accordance with an exemplary embodiment of the present disclosure;

FIG. 10 is a schematic representation of an AML Alert investigation dashboard generated by the exemplary system depicting risk evidence and transactional relationships in accordance with an exemplary embodiment of the present disclosure;

Figure 1:
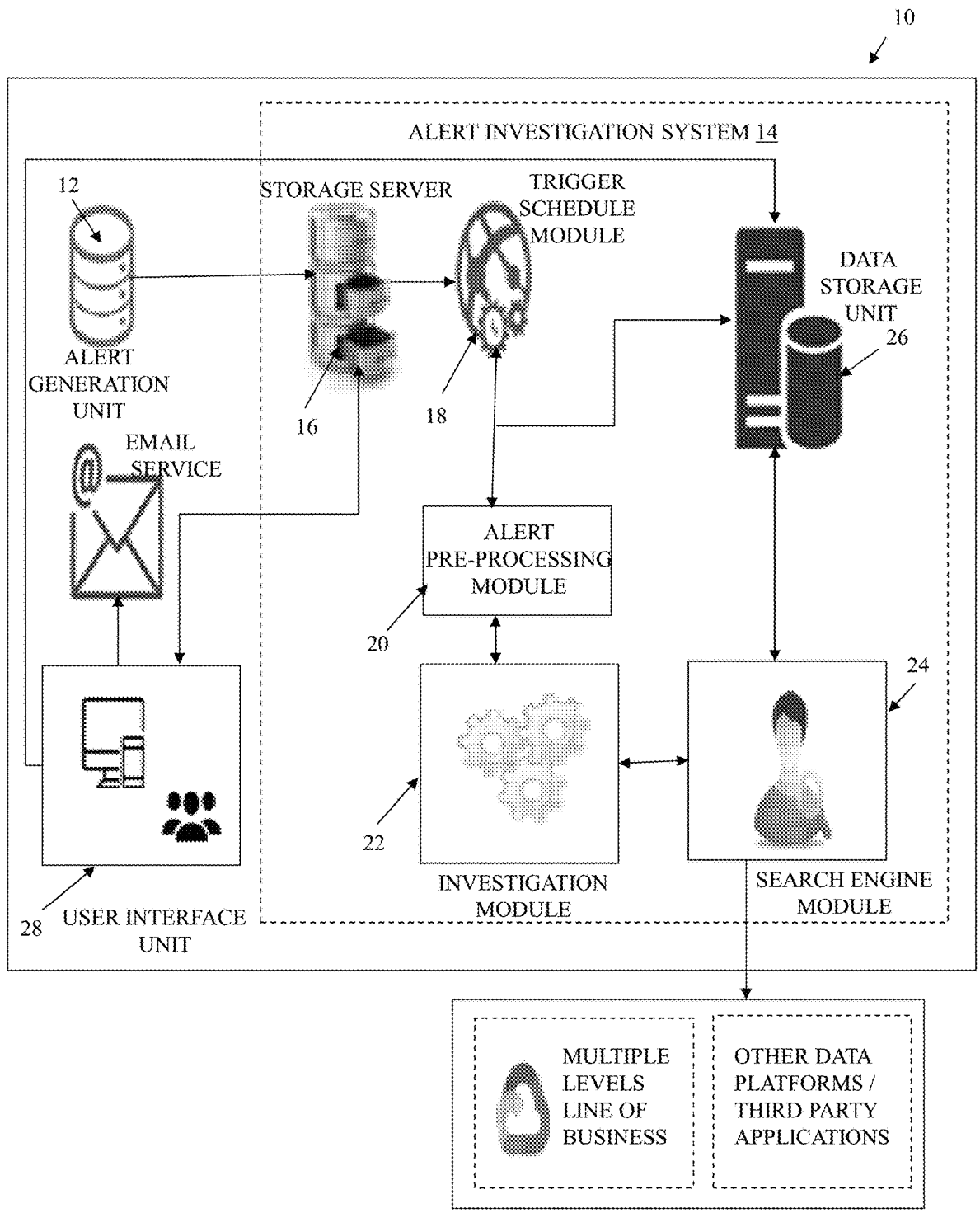
FIG. 1 illustrates a schematic diagram of an exemplary architecture of an automated AML alert investigation and disposition system according in accordance with an embodiment of the present disclosure.

Further, persons skilled in the art to which this disclosure belongs will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those of ordinary skill in the art having the benefit of the description herein.

DETAILED DESCRIPTION OF THE EXEMPLARY EMBODIMENTS

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such a process or a method. Similarly, one or more devices or sub-systems or elements or structures or components preceded by "comprises . . . a" does not, without more constraints, preclude the existence of other devices, other sub-systems, other elements, other structures, other components, additional devices, additional sub-systems, additional elements, additional structures, or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Embodiments of the present disclosure will be described below in detail with reference to the accompanying figures.

In accordance with certain embodiments of the present disclosure, an automated Anti-Money Laundering (AML) alerts investigation and disposition management system is disclosed. The automated AML alerts investigation and disposition system includes an alert generation unit configured to generate alert data representative of AML alert transactions of one or more entities through a financial institution. The automated AML alerts investigation and disposition system further includes an alert investigation system communicatively coupled to the alert generation unit. The alert investigation system includes a storage server communicatively configured to receive the alert data from the alert generation unit and a trigger schedule module communicatively coupled to the storage server and configured to trigger a plurality of alerts of the alert data based on at least one of time instances and transaction events. The alert investigation system further includes an investigation module communicatively coupled to trigger schedule module and configured to receive the plurality of alerts of the alert data and categorize the plurality of alerts into one or more disposition categories based on a plurality of predefined customizable rules.

The exemplary automated alert investigation solution enhances and optimizes relationship between financial institutions by utilizing the core modules with respect to a region, country, business unit, nature, scope, and objective of AML transaction monitoring compliance. The exemplary solution has been designed with a focus on AML transaction monitoring investigation processes with an aim to automate manual processes, while leveraging the customer risk profiling, negative news in public domain, historical information about customers/entities/accounts. Such an exemplary solution can drive the alerts disposition efficiency and accuracy, thereby helping the financial institutions to comply with regulations and reduce operating costs by reducing manual workforce and also reduce fines due to inaccuracy of the investigation process as a part of the regulatory reporting.

FIG. 1 illustrates a schematic diagram of an exemplary architecture of an automated AML, alert investigation and disposition system 10 in accordance with an embodiment of the present disclosure. The automated AML alert investigation and disposition system 10 includes alert generation unit 12 and an alert investigation system 14. The alert investigation system 14 includes a storage server 16, a trigger schedule module 18, an alert pre-processing module 20, an investigation module 22, a search engine module 24, and a data storage unit 26.

In the illustrated embodiment, the alert generation unit 12 is communicatively coupled to the storage server 16 and configured to generate alert data representative of AML alert transactions of one or more entities through a financial institution. The storage server 16 is configured to receive the alert data from the alert generation unit 12. The trigger schedule module 18 is communicatively coupled to the storage server 16 and configured to trigger a plurality of alerts of the alert data based on at least one of time instances and transaction events. The alert pre-processing module 20 is communicatively coupled to the trigger schedule module 18 and the investigation module 22. The alert pre-processing module 20 is configured to perform pre-process (filter) the alert data before being transmitted to the investigation module 22.

The investigation module 22 is configured to receive the plurality of alerts of pre-processed alert data and categorize the plurality of alerts into one or more disposition categories based on a plurality of predefined customizable rules. The search engine module 24 is communicatively coupled to the investigation module 22. The search engine module 24 is configured to generate search engine data based on category ratings of the plurality of alerts. The data storage unit 26 is communicatively coupled to the alert pre-processing module 20 and the investigation module 22. The data storage unit 26 is configured to store the pre-processed alert data, disposition categories data, predefined customizable rules data, and geographical data. The investigation module 22 is also configured to receive the pre-processed alert data, the disposition categories data, the predefined customizable rules data, the geographical data, and the search engine data and categorize the plurality of alerts into the one or more disposition categories based on the pre-processed alert data, the disposition categories data, the predefined scenarios data, the predefined customizable rules data, the geographical data, and the search engine data. In one embodiment, the data storage unit 26 is a cloud unit.

The automated AML alert investigation and disposition system 10 may further include a user interface unit 28 communicatively coupled to the storage server 16 and the data storage unit 26. The user interface unit 28 may be configured to manage/configure alert disposition customizable rules, meta data, perform document data management in the storage server 16 and the data storage unit 26 and to view the analytics report and maintain a workflow dashboard related to AML alerts investigation and disposition process.

Figure 2:
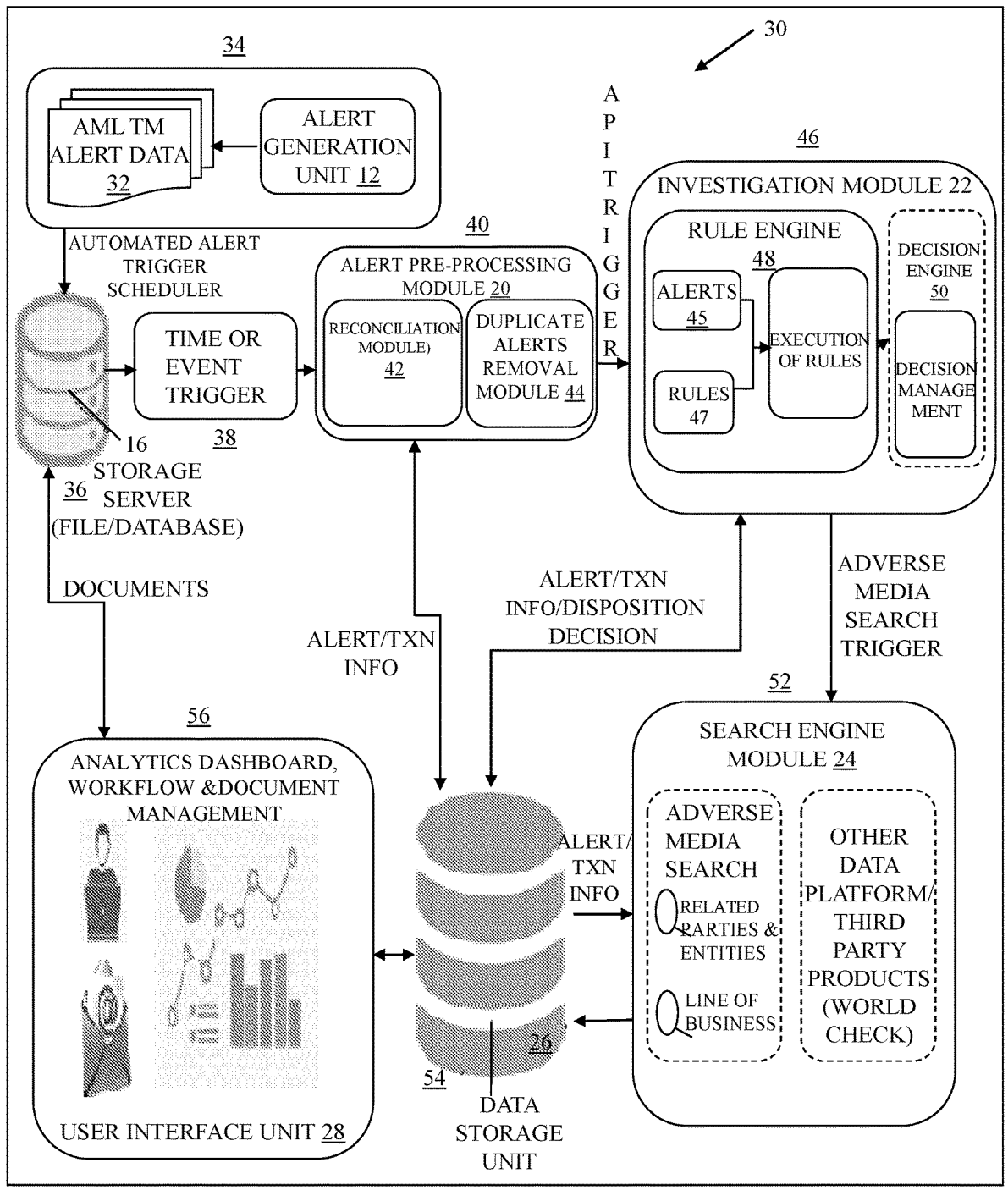
FIG. 2 illustrates a schematic block diagram of an automated AML alerts investigation and disposition management process in accordance with an embodiment of FIG. 1.

FIG. 2 illustrates a schematic block diagram of an automated AML alerts investigation and disposition management process 30 in accordance with an embodiment of FIG. 1. The process 30 includes generating alert data 32 representative of AML alert transactions of one or more entities through a financial institution from the alert generation unit 12 at step 34. The alert data 32 is stored in the storage server 16 at step 36. The alert data 32 includes a plurality of alerts, transaction data, associated entity data, transaction scenarios, the plurality of predefined customizable rules, algorithms, and meta data. The trigger schedule module 18 triggers a plurality of alerts of the alert data 32 based on at least one of time instances and transaction events at step 38. In other words, the plurality of alerts is triggered at pre-defined intervals or when associated files are being processed. In one embodiment, the trigger schedule module 18 triggers the plurality of alerts of the alert data 32 based on predetermined time instances. In another embodiment, the trigger schedule module 18 triggers the plurality of alerts of the alert data 32 based on predetermined transaction events. The alert pre-processing module 20 performs pre-processing (filtering) of the alert data before being transmitted to the investigation module 22 at step 40. The pre-processing includes reconciliation of the alerts and the corresponding transactions by a reconciliation module 42 and checking for duplication of alerts by a duplicate alerts removal module 44. If there are any differences during reconciliation, such alerts would be flagged and marked for further investigation and is not taken up for disposition.

The investigation module 22 receives the pre-processed alert data from the alert pre-processing module 20 and categorizes the plurality of alerts 45 of the pre-processed alert data into one or more disposition categories based on a plurality of predefined customizable rules 47 at step 46. Specifically, a multivariate dynamic rule engine 48 of the investigation module 22 executes a plurality of predefined customizable rules 47 to process the plurality of alerts 45 of the pre-processed alert data. Further, a decision engine 50 of the investigation module 22 generates a plurality of decisions to categorize the plurality of alerts 45 into the one or more disposition categories based on the plurality of predefined customizable rules. The disposition categories may include an alert closure category and an alert escalation category. In one embodiment, category ratings of the plurality of alerts 45 are checked to determine depth of investigation. For example, an alert with a low risk rating is typically checked only for associated transactions leading to the corresponding alert, whereas an alert with a medium/high risk rating may lead to a more comprehensive investigation including seeking additional information about the associated entity or entities. In another embodiment, even an alert with the low risk rating may also lead to a more comprehensive investigation. The risk ratings of the alerts are generated by the alert generation unit 12. The additional information can be used to decide whether to classify corresponding alerts into an alert closure category or an alert escalation category.

For a particular alert, if any pre-approval is available for an associated focus/entity, then the particular alert is closed. Upon completion of the risk rating check, and if no disposition decision is made such alerts are subjected to an activity check. The activities can be categorised including but not limited into day-to-day common transactions, transactions dealing with government institutions, client related transactions, loans and related transactions, transactions dealing with banking corporates, client transactions, investment related transactions, standard transactions and corporate transactions. Such activity data can be used to categorise the alerts to particular disposition categories. The disposition data based on the customizable rules 47 including transactions, risks, and final decisions of the alerts are stored into the data storage unit 26.

Further, additional information including search engine data are generated by the search engine module 24 based on category ratings of the plurality of risks at step 52. In one embodiment, if a risk has a medium/high rating, the search engine module 24 is used to perform a more comprehensive investigation, for example, to obtain additional information such as Google search information for finding adverse news related to the associated entity/entities and line of business. In another embodiment, the additional information can be obtained from other data platforms and third-party products used by financial institutions. In one specific embodiment, the adverse news is scanned for check for AML compliance program specific keywords. If any such keywords are found in the search results of the associated party, then the particular alert is flagged. In one example, the keywords may be categorised into category A, category B, and category C. Any adverse news with the keywords under categories A and B can be escalated while negative news with Keywords under category C can be flagged to a human analyst at the user interface unit 28 for further investigation for disposition.

Financial institutions typically identify certain geographies as high risk due to the increased risk for money laundering Financial institutions also maintain watch lists or red flags or list of entities based on previous experience that warrant enhanced scrutiny Financial institutions are also required to monitor for activity involving entities appearing in externally generated lists, such as Financial Action Task Force (FATF) watch lists. Such monitoring of transactions involving high-risk geographies and entities can also be used to categorise the alerts 47.

The data storage unit 26 stores the search engine data including the adverse news data at step 54. All the processed alerts are stored into the data storage unit 26 for reference purpose. After a certain specified look-back period (for example, 30 or 90 days), such data can be stored into an archive within the data storage unit 26. As mentioned earlier, the disposition data based on customizable rules including transactions, risks, and final decisions of the alerts are stored into the data storage unit 26. More specifically, the data storage unit 26 stores the pre-processed alert data from the alert pre-processing module 20, the disposition categories data from the investigation module 22, the predefined customizable rules data, the geographical data, and the search engine data from the search engine module 24.

In one embodiment, the investigation module 22 performs checking of the alerts/associated transactions of the pre-processed alert data against the historical disposition categories data, and if any new alert/associated transaction has similarity with an historical alert/transaction, then the disposition category of the historical alert/transaction is chosen and applied to the new alert/transaction.

The user interface unit 28 performs document data management in the storage server 16 and the data storage unit 26 and further configures rules, generates analytics report, and maintains a workflow dashboard related to AML alerts investigation and disposition process at step 56.

The exemplary alerts investigation and disposition solution has been designed to automate the manual processes, while leveraging customer risk profiling, adverse news in public domain, and historical information about customers/entities/accounts. The exemplary solution facilitates to enhance the disposition efficiency and accuracy, establishing a traceability of risks involved, and relationship between parties on associated transactions by helping the financial institutions to comply with regulations and also reduce the operating costs by reducing manual workforce and fines due to inaccuracy of the investigation process as a part of the regulatory reporting.

Figure 3:
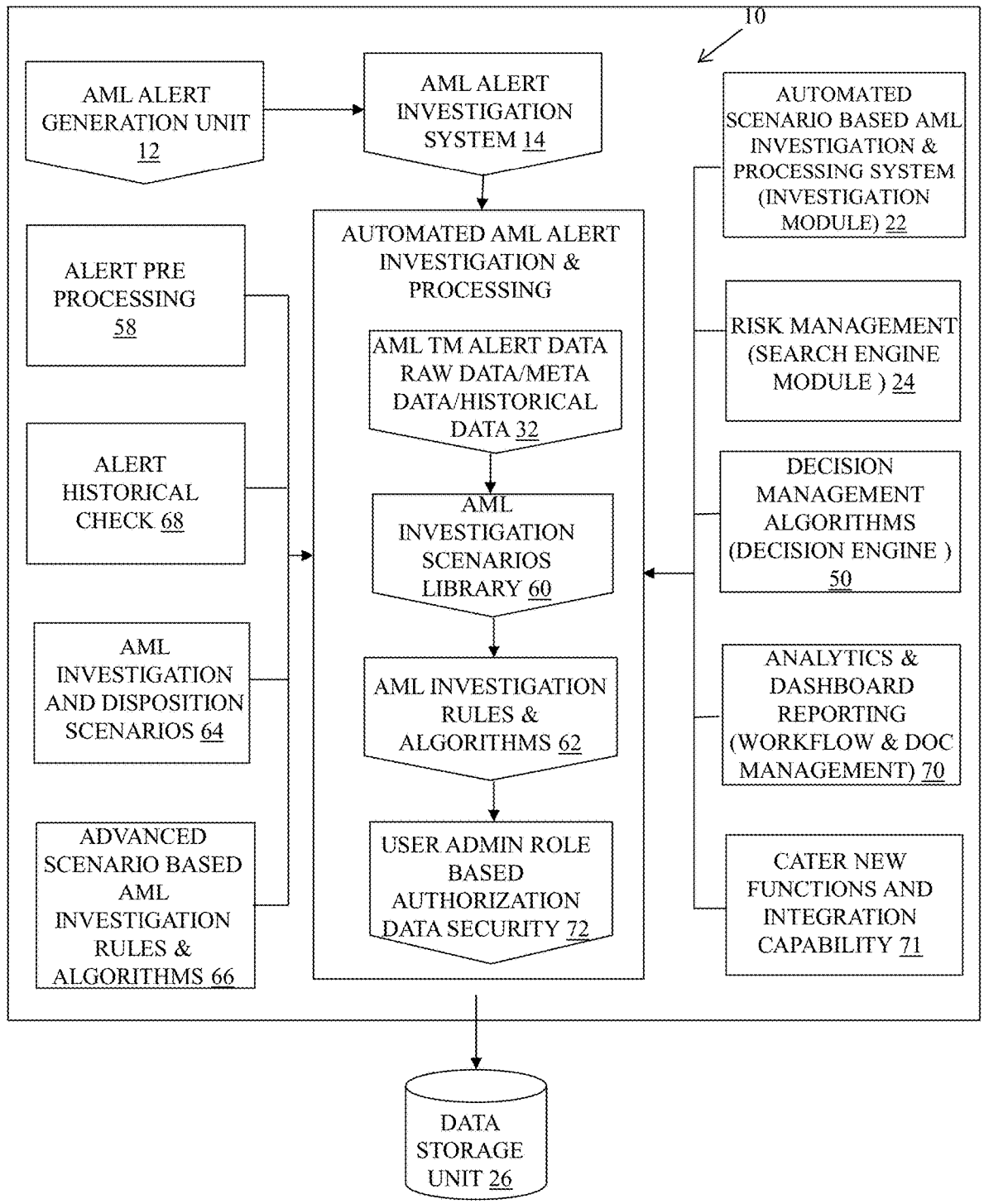
FIG. 3 illustrates a schematic block diagram of an exemplary operational process model and associated data elements and interface modules of the automated AML alerts investigation and disposition system in accordance with embodiments of the present disclosure.

FIG. 3 illustrates a schematic block diagram of an exemplary operational process model and associated data elements and interface modules of the automated AML alerts investigation and disposition system 10 in accordance with embodiments of the present disclosure. The alert generation unit 12 is configured to generate alert data 32 representative of AML alert transactions of one or more entities through a financial institution. The alert data 32 is stored in the storage server. The alert data 32 may include raw data and meta data. More specifically, the alert data 32 includes a plurality of alerts, transaction data, associated entity data, historical data, transaction scenarios, the plurality of predefined customizable rules, algorithms, and meta data. The alert investigation system 14 is communicatively coupled to the alert generation unit 12.

The alert pre-processing module is configured to perform pre-processing (filtering) (step 58) of the alert data 32 before being transmitted to the investigation module 22 of the alert investigation system. The investigation module 22 is configured to receive the pre-processed alert data from the alert pre-processing module and categorizes the plurality of alerts of the pre-processed alert data into one or more disposition categories based on a plurality of predefined customizable rules. Specifically, the multivariate dynamic rule engine of the investigation module 22 is configured to execute a plurality of predefined customizable rules to process the plurality of alerts of the pre-processed alert data. Further, the decision engine 50 of the investigation module 22 is configured to generate a plurality of decisions to categorize the plurality of alerts into the one or more disposition categories based on the plurality of predefined customizable rules. The disposition categories may include alert closure category and alert escalation category.

The disposition data based on customizable rules including transactions, risks, and final decisions of the alerts are stored into the data storage unit 26. The data storage unit 26 includes investigation scenarios library 60 and customizable rules and algorithms library 62. The investigation module 22 is configured to choose investigation scenarios 64, customizable rules and algorithms 66 from respective libraries 60, 62 based on the pre-processed alert data and categorize the plurality of alerts of the pre-processed alert data into one or more disposition categories.

Further, additional information including search engine data are generated by the search engine module 24 based on category ratings of the plurality of risks. The additional information may include transactions involving high-risk geographies and entities which can also be used to categorise the alerts. The data storage unit 26 is configured to store the search engine data including the adverse news data. All the processed alerts are stored into the data storage unit for reference purpose. The disposition data based on customizable rules including transactions, risks, and final decisions of the alerts are stored into the data storage unit 26. More specifically, the data storage unit 26 is configured to store the pre-processed alert data from the alert pre-processing module, the disposition categories data from the investigation module, the predefined customizable rules data, the geographical data, and the search engine data from the search engine module 24.

The investigation module 22 is configured to perform checking of the alerts/associated transactions of the pre-processed alert data against the historical disposition categories data, and if any new alert/associated transaction has similarity with an historical alert/transaction, then the disposition category of the historical alert/transaction is chosen and applied to the new alert/transaction (step 68).

The user interface unit is configured to perform rule configuration, view dashboard reports, document data management in the storage server and the data storage unit and generates analytics report and maintain a workflow dashboard related to AML alerts investigation and disposition process (step 70). The alert pre-processing module, the investigation module 22, and the search engine module 24 have capability to integrate new modules and cater to new functions based on the pre-processed alert data, the disposition categories data, the predefined customizable rules data, the geographical data, and the search engine data (step 71). The access to various modules of the automated AML alerts investigation and disposition system 10 is controlled to maintain a role-based authorization (for example, a user administrator) for purposes related to financial institution data security (step 72). Specifically, the user interface unit 28 can be access controlled to maintain a role-based authorization for purposes related to data security.

Figure 4:
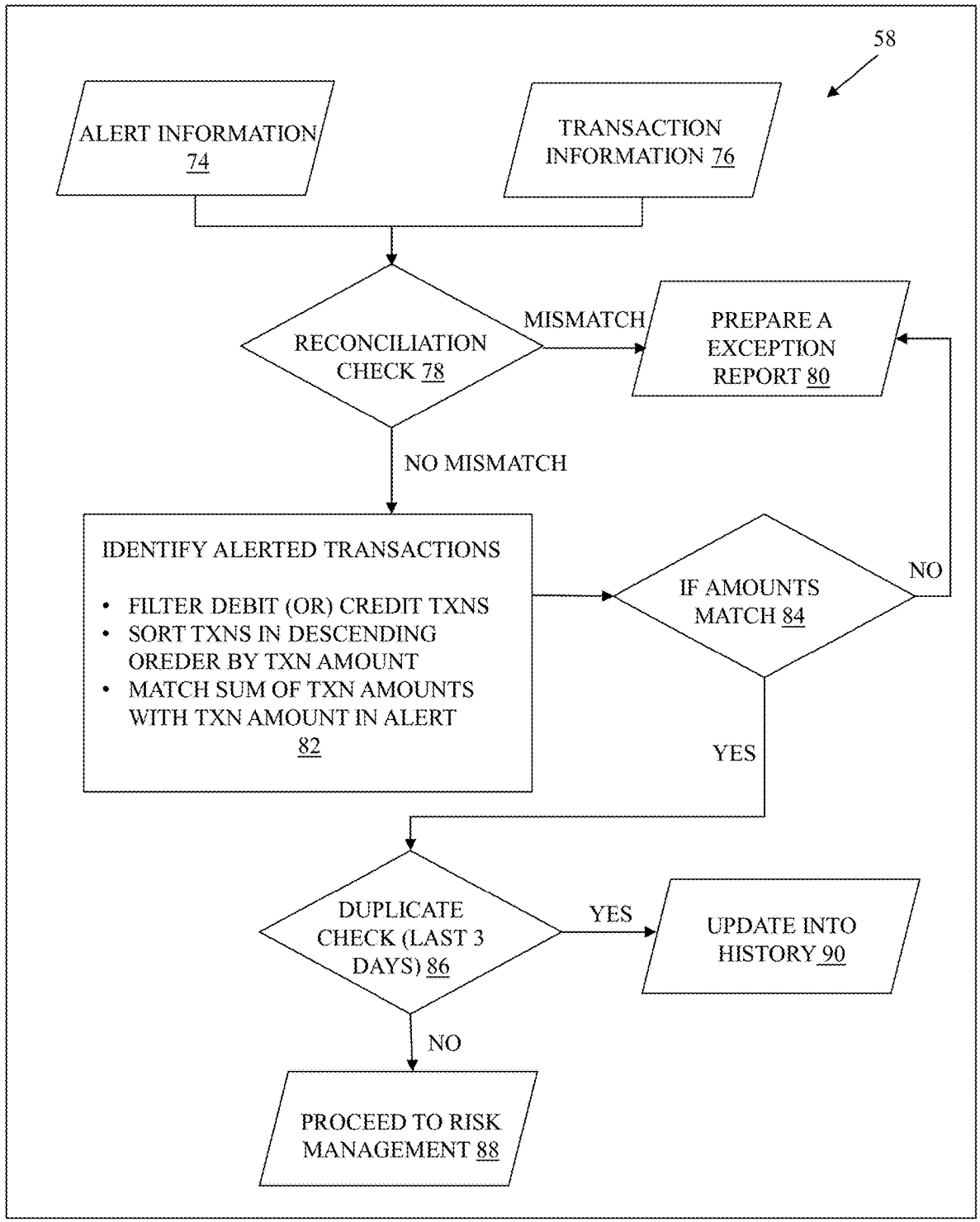
FIG. 4 is a flow chart illustrating exemplary steps involved in a method for pre-processing the alert data in accordance with the embodiment of FIG. 3.

FIG. 4 is a flow chart illustrating exemplary steps involved in a method for pre-processing 58 the alert data 32 in accordance with the embodiment of FIG. 3. As discussed earlier, the alert data 32 includes a plurality of alerts 74, transaction data 76, and associated entity data. The alert pre-processing module 20 performs pre-processing (filtering) of the alert data 32 before being transmitted to the investigation module 22. The pre-processing includes reconciliation check of the alerts 74 and the corresponding transaction data 76 by the reconciliation module (step 78). If there is a mismatch between at least some alerts and corresponding transactions, then an exception report (step 80) is generated. If there is no mismatch between at least some alerts and corresponding transactions, then such alerts are identified (step 82). In one embodiment, during the step 82, predefined transactions are filtered (for example, debit or credit card transactions) and then filtered transactions are arranged in predefined order with reference to the transaction amounts (for example, descending order). Then, the total of the transaction amounts is matched with transaction amounts of the corresponding alerts (84). If there is match between the total of the transaction amounts and the transaction amounts of the corresponding alerts, then then check for duplication of such alerts is performed by the duplicate alerts removal module 44 (step 86). The pre-processed alerts after duplication check would be taken for disposition by the investigation module 22 (step 88). The duplicate alerts are stored in the data storage unit at step 90.

Figure 5:
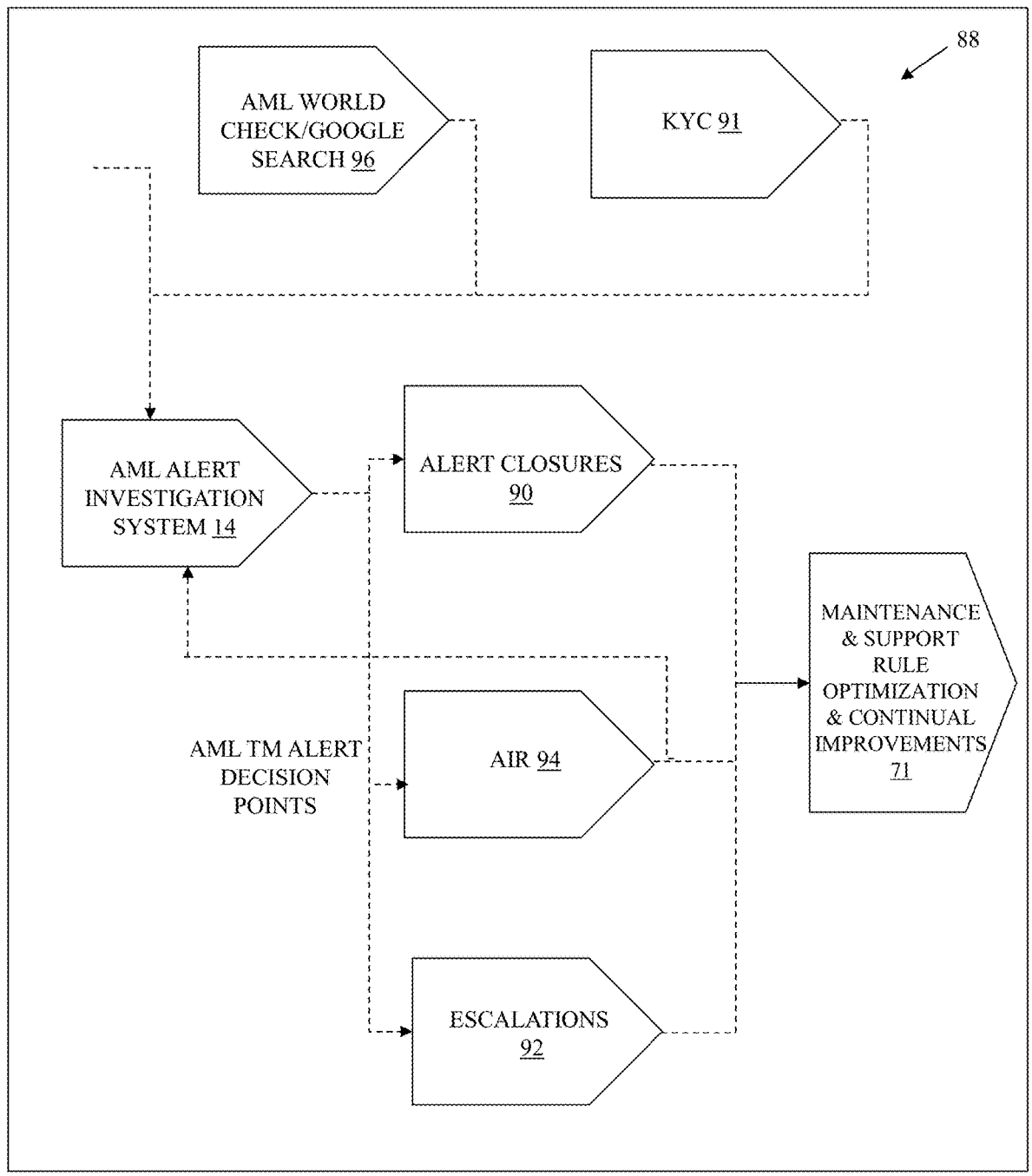
FIG. 5 illustrates a schematic block diagram of an exemplary operational process model for an AML alerts investigation and disposition technique in accordance with an exemplary embodiment of FIG. 3.

FIG. 5 illustrates a schematic block diagram of an exemplary operational process model 88 for an AML alerts investigation and disposition technique in accordance with an exemplary embodiment of FIG. 3. The alert generation unit 12 is configured to generate the alert data 32 representative of AML alert transactions of one or more entities through a financial institution. The alert data 32 is stored in the storage server 16. The alert data 32 includes a plurality of alerts, transaction data, and associated entity data such as Know Your Customer (KYC) information (91). The alert pre-processing module, the investigation module 22, and the search engine module 24 have capability to integrate new modules and cater to new functions based on the pre-processed alert data, the disposition categories data, the predefined customizable rules data, the geographical data, and the search engine data (step 71).

The investigation module of the alert investigation system 14 is configured to receive the pre-processed alert data from the alert pre-processing module and categorize the plurality of alerts of the pre-processed alert data into one or more disposition categories based on a plurality of predefined customizable rules. The disposition categories may include an alert closure category 90 and an alert escalation category 92. In one embodiment, category ratings of the plurality of alerts are checked to determine depth of investigation. The additional information can be used to decide whether to classify corresponding alerts into an alert closure category or an alert escalation category (step 94).

Further, additional information (94) including search engine data are generated by the search engine module 24 based on category ratings of the plurality of risks. In one embodiment, if a risk has a medium/high rating, the search engine module 24 is used to perform a more comprehensive investigation, for example, to obtain risk information such as Google search information for finding adverse news related to the associated entity/entities and line of business. In another embodiment, the additional information can be obtained from other data platforms and third-party products. Monitoring of transactions involving high-risk geographies and entities can also be used to categorise the alerts.

Figure 6:
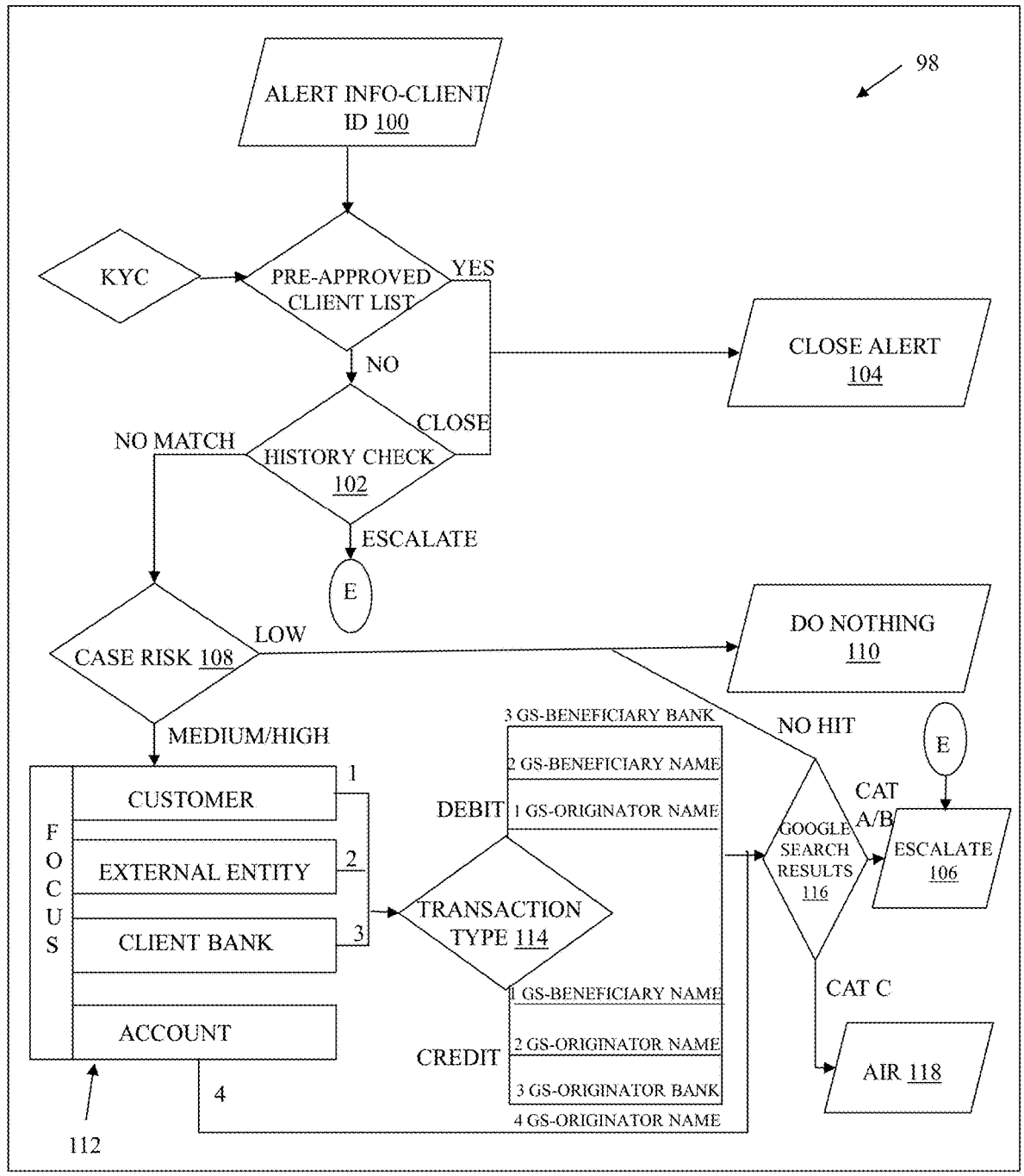
FIG. 6 illustrates a schematic flow chart of an exemplary AML alerts investigation and disposition technique for checking risk and history of alerts in accordance with an exemplary embodiment of FIG. 3.

FIG. 6 illustrates a schematic flow chart 98 of an exemplary AML alerts investigation and disposition technique in accordance with an exemplary embodiment of FIG. 3. The process includes generating alert data 32 representative of AML alert transactions of one or more entities through a financial institution from the alert generation unit 12 at step 100. The alert data 32 includes a plurality of alerts, transaction data, and associated entity data such as KYC information 91. The process further includes checking if any pre-approval is available for an associated focus/entity at step 102. For a particular alert, if any pre-approval is available for an associated focus/entity, then the particular alert is closed at step 104. In one embodiment, the investigation module 22 performs checking of the alerts/associated transactions of the pre-processed alert data against the historical disposition categories data, and if any new alert/associated transaction has similarity with an historical alert/transaction, then the disposition category of the historical alert/transaction is chosen and applied to the new alert/transaction. Such alerts can either be closed (step 104) or can be escalated (step 106) depending upon categorization. In one embodiment, category ratings of the plurality of alerts are checked to determine depth of investigation at step 108. For example, in one embodiment, an alert with a low risk rating is typically checked only for associated transactions leading to the corresponding alert and hence there may not be any action required (step 110). An alert with a medium/high risk rating may lead to a more comprehensive investigation including seeking additional information about the associated entity or entities specifically, the additional information may include focus/entity information 112 such as for example, type of customer, whether the entity is an external entity, bank, and account and/or associated type of transaction information 114. For example, if the type of transaction a credit transaction, associated information may include for example, beneficiary name, originator name, originator bank, and beneficiary bank.

Further, additional information including search engine data are generated by the search engine module 24 based on category ratings of the plurality of risks at step 116. In one embodiment, if a risk has a medium/high rating, the search engine module 24 is used to perform a more comprehensive investigation, for example, to obtain the risk information such as Google search information for finding adverse news related to the associated entity/entities and line of business. In another embodiment, the additional information can be obtained from other data platforms and third-party products. In one specific embodiment, the adverse news is scanned for check for AML compliance program specific keywords. If any such keywords are found in the search results of the associated party, then the particular alert is flagged. In one example, the keywords may be categorised into category A, category B, and category C. Any adverse news with the keywords under categories A and B can be escalated (step 106) while negative news with Keywords under category C can be flagged to a human analyst at the user interface unit for further investigation for disposition (step 118). Steps 106, 116, 118 can also be performed if a category rating of a risk is low. The additional information may also include transaction information involving high-risk geographies and entities can also be used to categorise the alerts.

Figure 7:
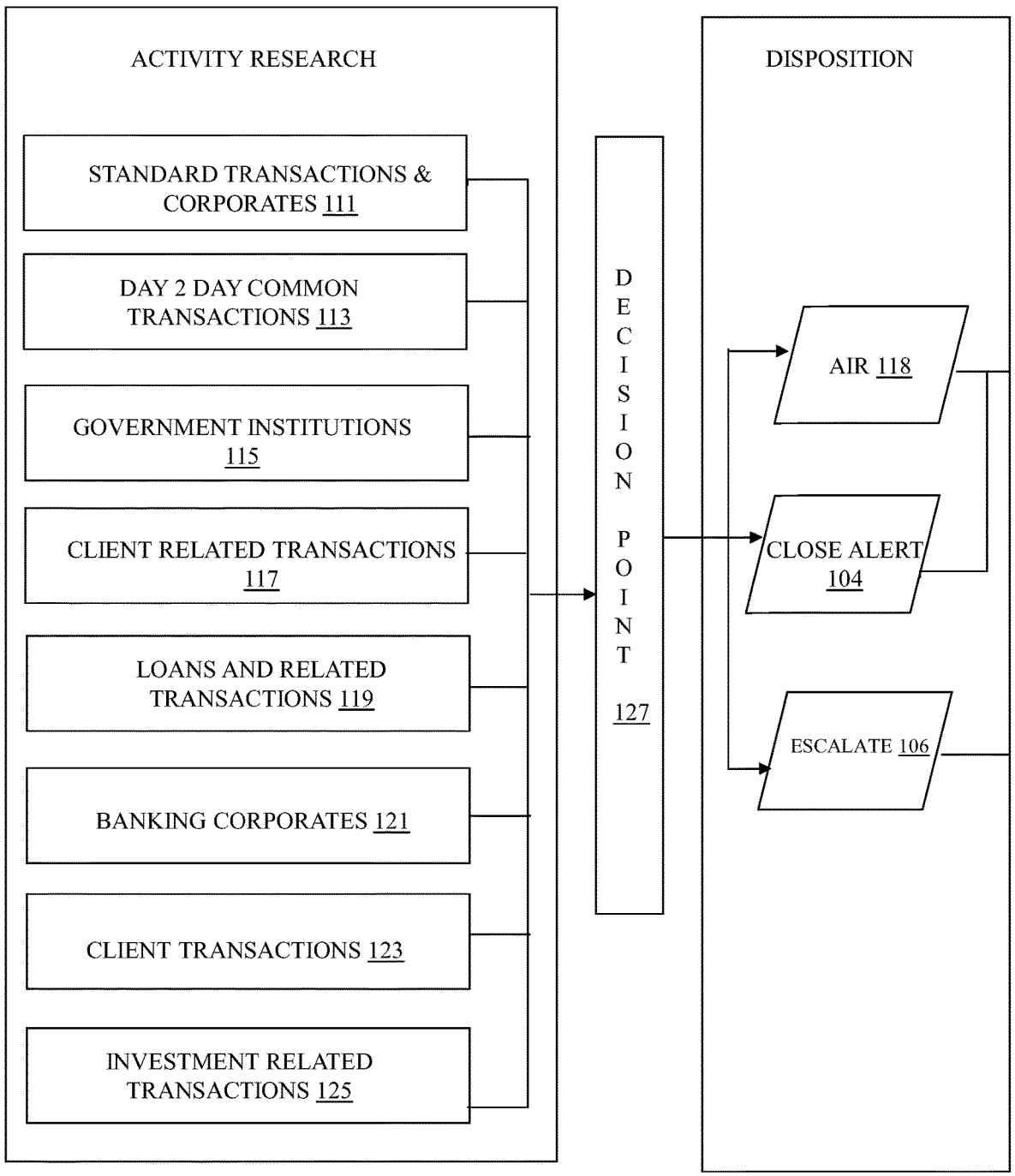
FIG. 7 is a block diagram representative of activity research check of an exemplary AML alerts investigation and disposition technique in accordance with an exemplary embodiment of the present disclosure.

FIG. 7 is a block diagram representative of activity research check of an exemplary AML alerts investigation and disposition technique in accordance with an exemplary embodiment. As mentioned earlier, upon completion of the risk rating check, and if no disposition decision is made such alerts are subjected to an activity check. The activities can be categorised including but not limited into standard transactions and corporate transactions 111, day-to-day common transactions 113, transactions dealing with government institutions 115, client related transactions 117, loans and related transactions 119, transactions dealing with banking corporates 121, client transactions 123, and investment related transactions 125. Such activity data can be used to categorise the alerts to particular disposition categories at step 127. Such alerts can either be closed (the step 104) or can be escalated (the step 106) depending upon categorization. Further, additional information including search engine data are generated by the search engine module based on category ratings of the plurality of risks at the step 118.

Figure 8:
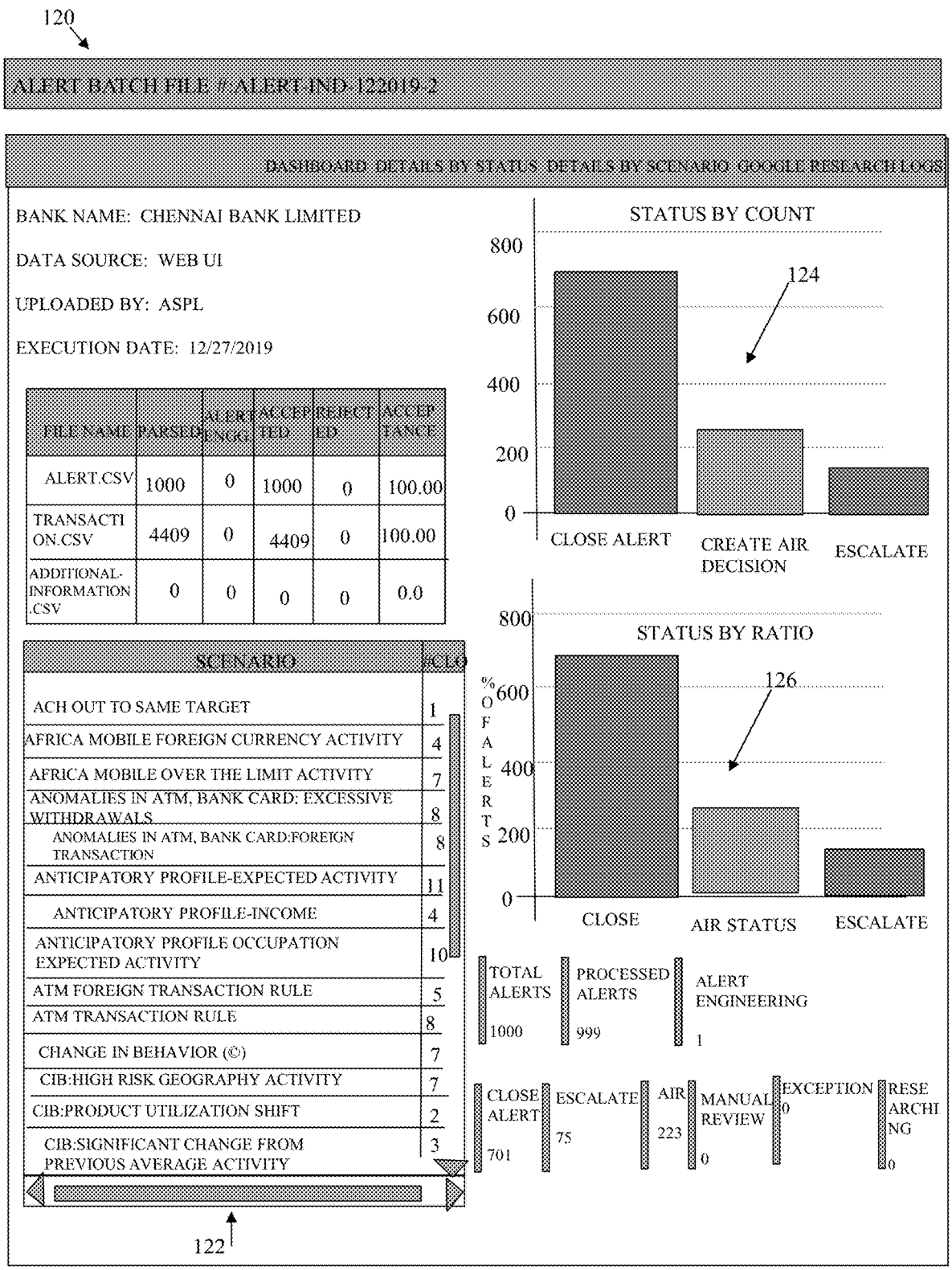
FIG. 8 is a schematic representation of an AML Alert investigation dashboard generated by the exemplary system in accordance with an exemplary embodiment of the present disclosure.

FIG. 8 is a schematic representation of an investigation dashboard 120 generated by the exemplary system in accordance with an exemplary embodiment of the present disclosure. The dashboard 120 has entity information 122 having associated transaction information represented in a tabular format. The dashboard 120 further includes a graphical bar chart 124 which is indicative of status by count information of alert closure category, alert escalation category, and additional information requirement category. The dashboard 120 further includes a graphical bar chart 126 which is indicative of status by ratio information of alert closure category, alert escalation category, and additional information requirement category. The dashboard 120 further includes information related to total number of alerts and total number of processed alerts. Specifically, the dashboard 120 includes the AML transaction details, risk evidence, transactional relationships between the parties of associated transactions as documented proof for regulatory compliance.

FIG. 9 is a schematic representation of an investigation dashboard 128 generated by the exemplary system in accordance with an exemplary embodiment of the present disclosure. The dashboard 128 has information related to a plurality of generated alerts associated with transactions from an originator to a plurality of beneficiaries provided in tabular format. In the illustrated embodiments, the alerts were closed because the alerts are related to common transactions because associated transaction codes are classified as general operating cost transactions, for example, utility bills such as water bills. The dashboard 128 has documented proof of associated transactions and risks for regulatory compliance.

FIG. 10 is a schematic representation of an investigation dashboard 130 generated by the exemplary system in accordance with an exemplary embodiment of the present disclosure. The dashboard 130 has information related to a plurality of generated alerts associated with transactions from an originator to a plurality of beneficiaries provided in tabular format. In the illustrated embodiments, the alerts ae escalated additional information including search engine data included adverse entity news. The dashboard 130 has documented proof of associated transactions and risks for regulatory compliance.

Figure 11:
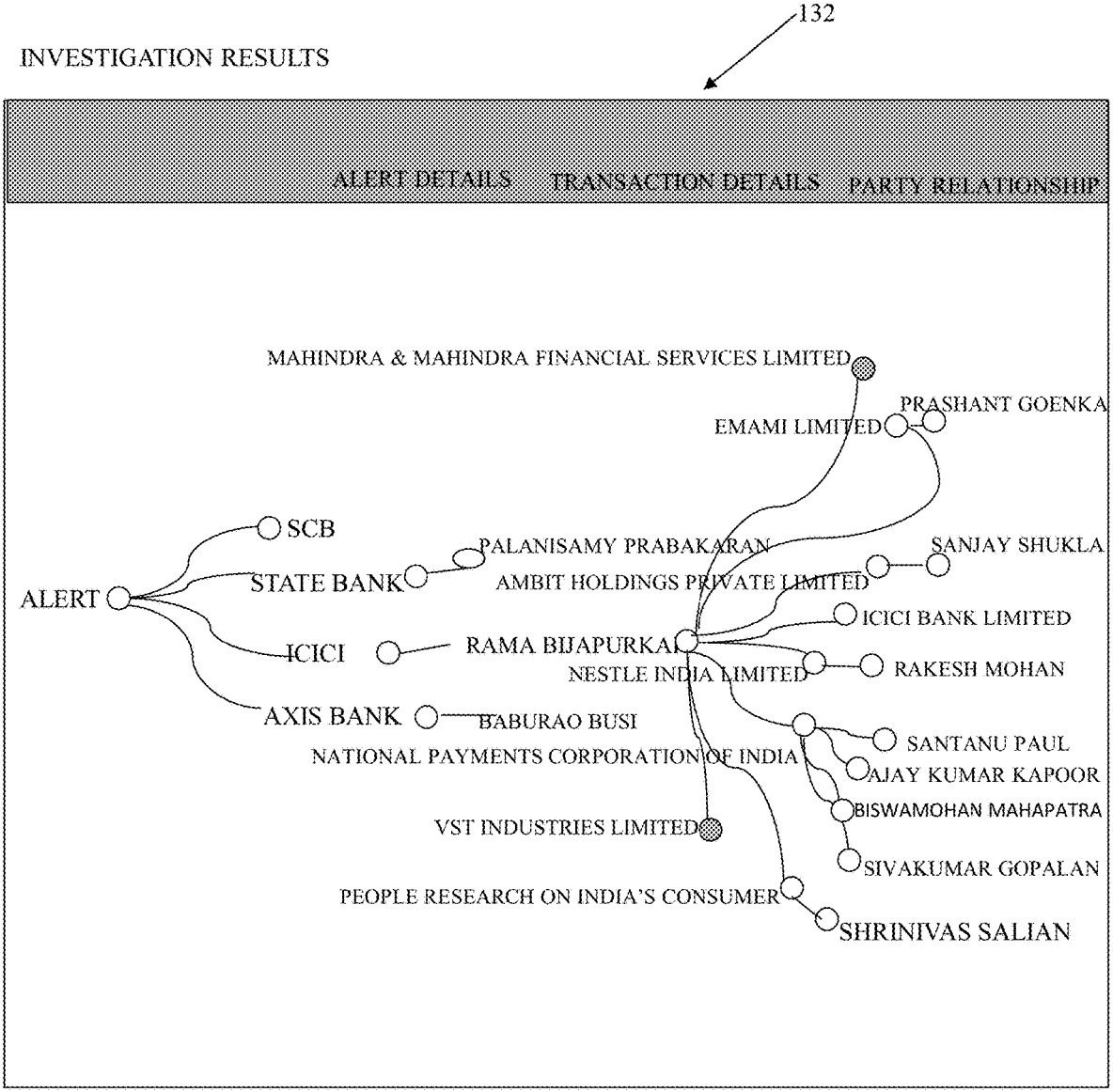
FIG. 11 is a schematic representation of an AML Alert investigation alert data chart processed generated by the exemplary system depicting risk evidence and transactional relationships in accordance with an exemplary embodiment of the present disclosure.

FIG. 11 is a schematic representation of an investigation alert data chart 132 generated by the exemplary system in accordance with an exemplary embodiment of the present disclosure. The alert data has originator name, beneficiary names, originator bank, and beneficiary bank, and party relationships.

Figure 12:
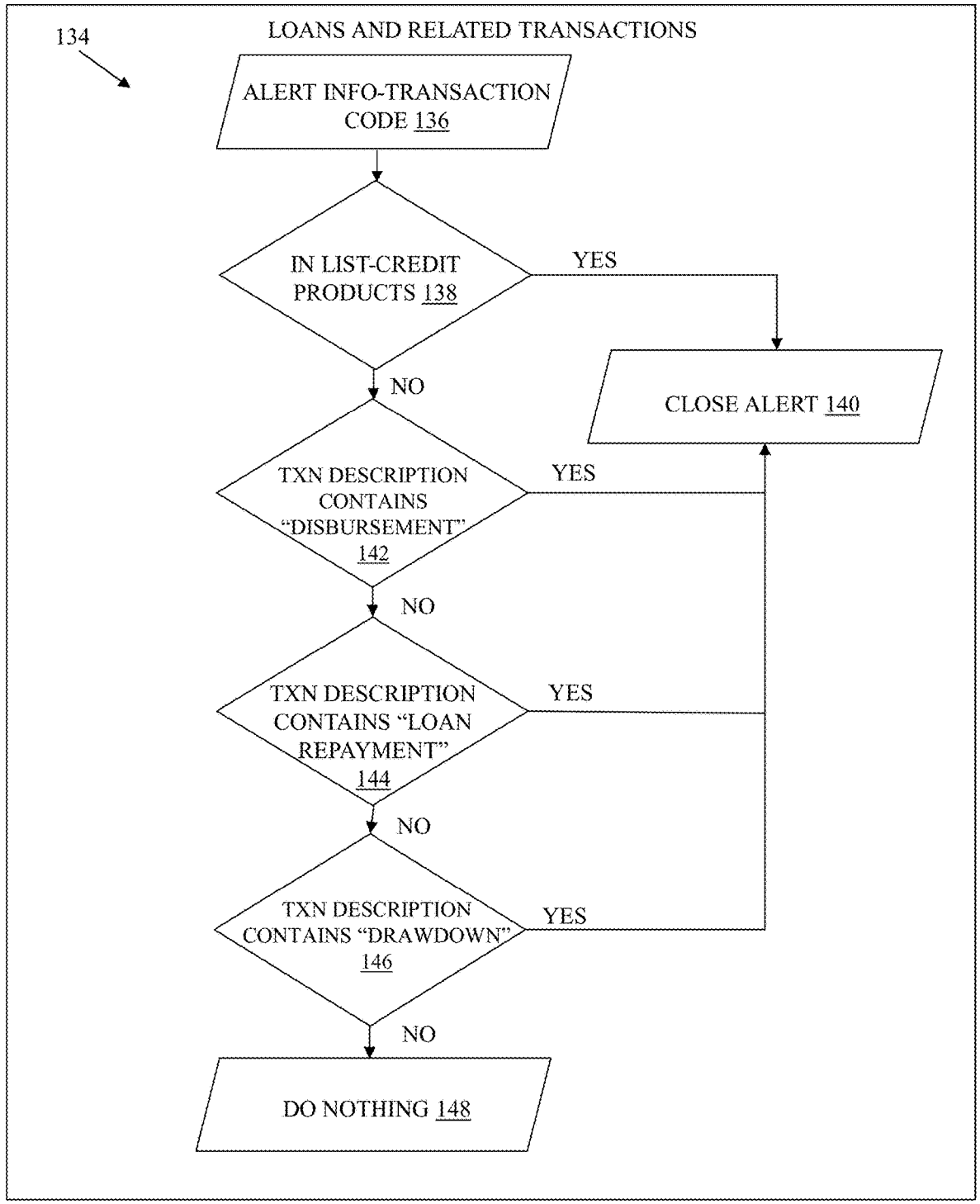
FIG. 12 is a flow chart illustrating an activity research check of an exemplary AML alerts investigation and disposition technique for loan and related transactions in accordance with an exemplary embodiment.

FIG. 12 is a flow chart 134 illustrating an activity research check of an exemplary AML alerts investigation and disposition technique for loan and related transactions in accordance with an exemplary embodiment. The process includes generating alert data representative of AML alert transactions of one or more entities through a financial institution from the alert generation unit at step 136. In one embodiment, the alert data would include associated transaction codes and descriptions related to loan and related transactions. Approved list of credit products is checked to find if the transaction codes and descriptions are found in the list of credit products at step 138. If the transaction codes and descriptions are found in the list of credit products, associated alerts are closed at step 140. If the transaction codes and descriptions are not found in the list of credit products, then associated transaction description is checked to find the keyword "disbursement" transaction at step 142. If the keyword "disbursement" transaction is found in the associated transaction description, associated alerts are closed at step 140. If the keyword "disbursement" transaction is not found in the associated transaction description, then associated transaction description is checked to find the keyword "loan repayment" transaction at step 144. If the keyword "loan repayment" transaction is found in the associated transaction description, associated alerts are closed at step 140. If the keyword "loan repayment" transaction is not found in the associated transaction description, then associated transaction description is checked to find the keyword "drawdown" transaction at step 146. If the keyword "drawdown" transaction is found in the associated transaction description, associated alerts are closed at step 140. If the keyword "drawdown" transaction is not found in the associated transaction description, the no further action may be taken at step 148.

Figure 13:
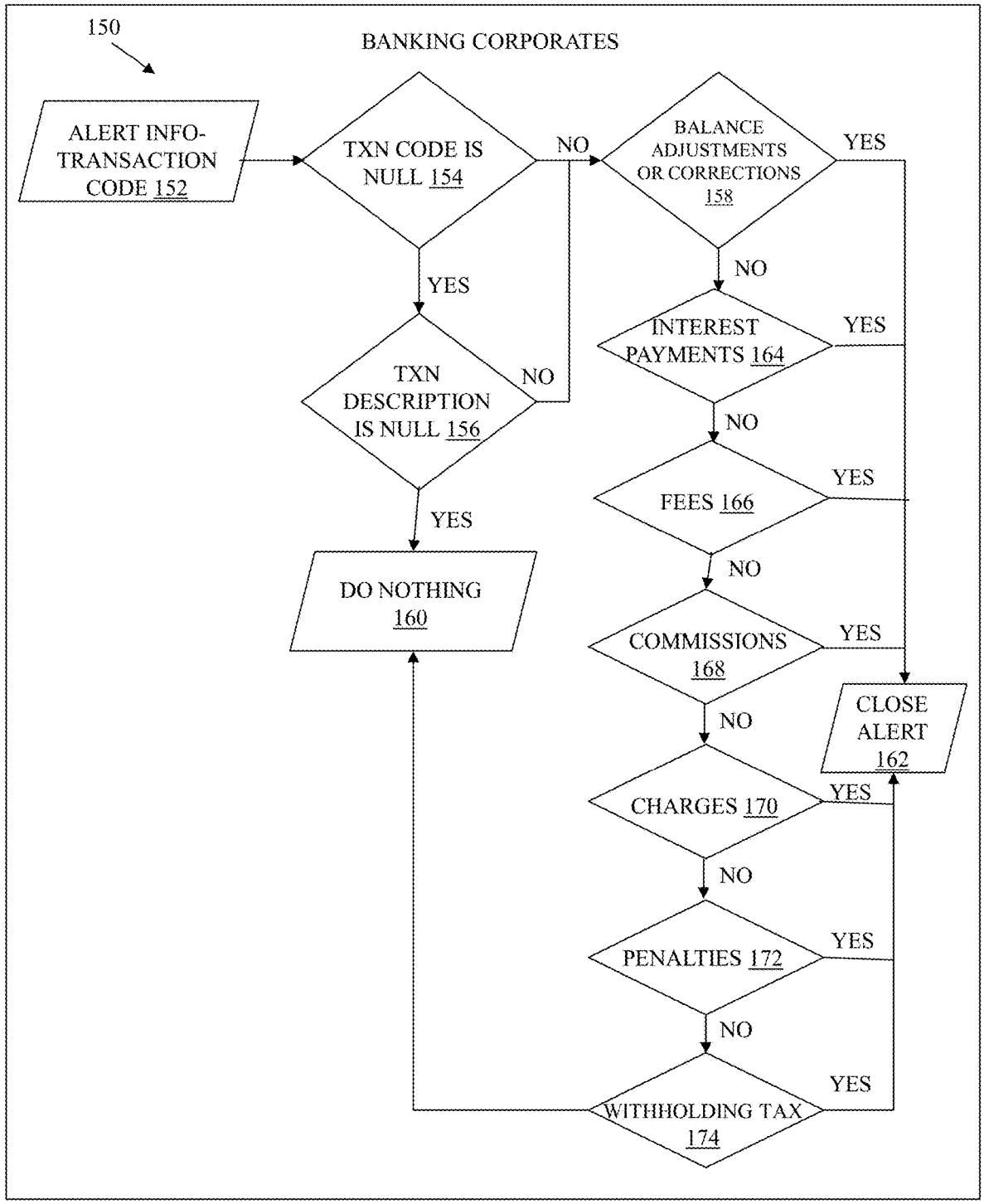
FIG. 13 is a flow chart illustrating an activity research check of an exemplary AML alerts investigation and disposition technique for banking corporate transactions in accordance with an exemplary embodiment.

FIG. 13 is a flow chart 150 illustrating an activity research check of an exemplary AML alerts investigation and disposition technique for banking corporate transactions in accordance with an exemplary embodiment. The process includes generating alert data representative of AML alert transactions of one or more entities through a financial institution from the alert generation unit at step 152. In one embodiment, the alert data would include associated transaction codes and descriptions related to banking corporates. The alert data are checked to find if there are transaction codes at step 154. If there are no transaction codes in the alert data, then alert data are checked to find if there are transaction descriptions at step 156. If there are transaction codes in the alert data, then it is checked whether the present transaction codes are related to balance adjustments or correction transactions at step 158. If there are no transaction descriptions in the alert data, then no further action is taken at step 160. If there are transaction descriptions in the alert data, then it is checked whether the present transaction descriptions are related to balance adjustments or correction transactions at step 158. If the present transaction codes and transaction descriptions are related to balance adjustments or correction transactions, then associated alerts are closed at step 162. If the present transaction codes and transaction descriptions are not related to balance adjustments or correction transactions, then it checked whether the present transaction codes and transaction descriptions are related to interest payment transactions at step 164. If the present transaction codes and transaction descriptions are related to interest payment transactions, then associated alerts are closed at step 162.

If the present transaction codes and transaction descriptions are not related to interest payment transactions, then it checked whether the present transaction codes and transaction descriptions are related to associated fees related transactions at step 166. If the present transaction codes and transaction descriptions are related to associated fees related transactions, then associated alerts are closed at step 162. If the present transaction codes and transaction descriptions are not related to associated fees related transactions, then it checked whether the present transaction codes and transaction descriptions are related to associated commission related transactions at step 168. If the present transaction codes and transaction descriptions are related to associated commission related transactions, then associated alerts are closed at step 162. If the present transaction codes and transaction descriptions are not related to associated commission related transactions, then it checked whether the present transaction codes and transaction descriptions are related to associated charges related transactions at step 170. If the present transaction codes and transaction descriptions are related to associated charges related transactions, then associated alerts are closed at step 162. If the present transaction codes and transaction descriptions are not related to associated charges related transactions, then it checked whether the present transaction codes and transaction descriptions are related to associated penalties related transactions at step 172. If the present transaction codes and transaction descriptions are related to associated penalties related transactions, then associated alerts are closed at step 162. If the present transaction codes and transaction descriptions are not related to associated penalties related transactions, then it checked whether the present transaction codes and transaction descriptions are related to associated withholding tax related transactions at step 174. If the present transaction codes and transaction descriptions are related to associated withholding related transactions, then associated alerts are closed at step 162. If the present transaction codes and transaction descriptions are not related to withholding related transactions, then no further action is taken at step 160.

It should be noted herein that although FIGS. 12 and 13 are related to loan and related transactions and banking corporate transactions respectively, similar activity research check of an exemplary AML alerts investigation and disposition technique may be applicable to other transactions such as but not limited to standard transactions and corporate transactions, day-to-day common transactions, transactions dealing with government institutions, client related transactions, client transactions, and investment related transactions.

In one embodiment, the exemplary system may include at least one processor (not shown), an input/output (I/O) interface (not shown), and a memory (not shown). The at least one processor may be implemented as one or more microprocessors, microcomputers, microcontrollers, digital signal processors, central processing units, state machines, logic circuitries, and/or any device that manipulates signals based on operational instructions. Among other capabilities, the at least one processor is configured to fetch and execute computer-readable instructions stored in the memory.

The I/O interface may include a variety of client application and hardware interfaces, for example, a web interface, a graphical user interface, and the like. The I/O interface may allow the remote server to interact with a customer directly or through customer devices. Further, the I/O interface may enable the remote server to communicate with other computing devices such as web servers and external data servers (not shown). The I/O interface may facilitate multiple communications within a wide variety of networks and protocol types, including wired networks such as Local Area Network, cable, etc., and wireless networks such as Wireless Local Area Network, cellular, satellite, etc. The I/O interface may include one or more ports for connecting a plurality of devices to each other and/or to another server.

The memory may include any computer-readable medium known in the art, including, for example, volatile memory such as static random access memory (SRAM) and/or dynamic random access memory (DRAM) and/or non-volatile memory such as read only memory (ROM), erasable programmable ROM, flash memories, hard disks, optical disks, and/or magnetic tapes.

The exemplary system provides an integrated and effective tool for automated alert investigation management and governance arena that would bring a balanced view of alert investigation process, governance, enhancement and optimization between financial institution and regulator relationship through-out the alert investigation management lifecycle. The exemplary system and method enable an organization to build AML transaction monitoring alert investigation and compliance capabilities in terms of compliance and governance process improvements and optimizations cut across various key process areas including alert engineering, alert pre-processing, alert transaction and historical transaction analysis, alert activity research, decision management and reporting, performance management, value management, risk and compliance management. The exemplary system also provides effective decision management and suspicious reporting capabilities enabling governance of the various transaction alert investigations for various geographies with eKYC capabilities and for managing and mitigating effective risk management by establishing documented proof of associated transactions and risks for the regulatory compliance.

We claim:

1. A non-transitory computer readable medium comprising computer-readable instructions stored in a memory, which when executed by one or more processors enable:

an alert generation unit to generate alert data representative of AML alert transactions of one or more entities through a financial institution, wherein the alert data comprise the plurality of alerts, transaction data, associated entity data, transaction scenarios, the plurality of predefined customizable rules, algorithms, risk ratings of the plurality of alerts, and meta data;

a storage server of an alert investigation system to receive the alert data from the alert generation unit;

a trigger schedule module of the alert investigation system to trigger a plurality of alerts of the alert data based on at least one of time instances and transaction events;

an alert pre-processing module of the alert investigation system to generate pre-processed alert data from the alert data, wherein the alert pre-processing module comprises a reconciliation module and a duplicate alerts removal module; and an investigation module of the alert investigation system to receive the plurality of alerts of the pre-processed alert data, wherein the investigation module comprises a multivariate dynamic rule engine and a decision engine, wherein the multivariate dynamic rule engine is configured to execute the plurality of predefined customizable rules and the algorithms to process the plurality of alerts of the pre-processed alert data, and wherein the decision engine is configured to generate a plurality of decisions to categorize the plurality of alerts into the one or more disposition categories based on the plurality of predefined customizable rules, predefined scenarios data, and the algorithms, wherein an automated AML alerts investigation and disposition system comprises the alert generation unit and the alert investigation system.

2. The non-transitory computer readable medium as claimed in claim 1, wherein the alert investigation system further comprises a search engine module communicatively coupled to the investigation module, wherein the search engine module is configured to generate search engine data based on category ratings of the plurality of alerts.

3. The non-transitory computer readable medium as claimed in claim 2, wherein the alert investigation system further comprises a data storage unit communicatively coupled to the alert pre-processing module and the investigation module, wherein the data storage unit is configured to store the pre-processed alert data, disposition categories data, predefined customizable rules data, the algorithms, and geographical data.

4. The non-transitory computer readable medium as claimed in claim 3, wherein the data storage unit is further communicatively coupled to the search engine module, wherein the data storage unit is configured to store the search engine data comprising adverse news data.

5. The non-transitory computer readable medium as claimed in 1, wherein the investigation module is configured to receive the pre-processed alert data, disposition categories data, the predefined customizable rules data, geographical data, and search engine data and categorize the plurality of alerts into the one or more disposition categories based on the pre-processed alert data, the disposition categories data, the predefined customizable rules data, the geographical data, and the search engine data.

6. The non-transitory computer readable medium as claimed in claim 3, wherein the alert investigation system comprises an user interface unit communicatively coupled to the storage server and the data storage unit, wherein the user interface unit is configured to manage the predefined customizable rules, data management in the storage server and the data storage unit, generate and display analytics report, and maintain a workflow dashboard.

7. The non-transitory computer readable medium as claimed in claim 3, wherein the data storage unit is a cloud unit.

8. The non-transitory computer readable medium as claimed in claim 1, wherein the reconciliation module is configured to perform reconciliation check of the plurality of alerts with corresponding transaction data by:
   checking if there is a mismatch between at least some alerts of the plurality of alerts and the corresponding transactions data; and
   generating an exception report if there is the mismatch between at least some alerts of the plurality of alerts and the corresponding transactions data or identify the at least some alerts of the plurality of alerts if there is no mismatch between the at least some alerts and the corresponding transactions data.

9. The non-transitory computer readable medium as claimed in claim 1, wherein the investigation module is configured to generate an investigation alert data chart representative of an alert of the plurality of alerts of the pre-processed alert data, wherein the investigation data chart comprises an originator name, beneficiary names, an originator bank, beneficiary banks, and party relationships between the originator name and the beneficiary names.

* * * * *